US010271350B2

(12) United States Patent
Zhang et al.

(10) Patent No.: US 10,271,350 B2
(45) Date of Patent: Apr. 23, 2019

(54) METHODS, APPARATUSES, AND SYSTEMS FOR PROVIDING TRANSFER BLOCK INDICATION IN UPLINK GRANT-FREE TRANSMISSIONS

(71) Applicants: Alcatel-Lucent USA Inc., Murray Hill, NJ (US); Nokia Technologies OY, Espoo (FI)

(72) Inventors: Yuan Tao Zhang, Beijing (CN); Emad N. Farag, Flanders, NJ (US); Sigen Ye, Whitehouse Station, NJ (US); Zexian Li, Espoo (FI); Joseph H. Kang, Belle Mead, NJ (US); Karri Ranta-Aho, Espoo (FI)

(73) Assignees: Nokia Technologies Oy, Espoo (FI); Nokia of America Corporation, Murray Hill, NJ (US)

( * ) Notice: Subject to any disclaimer, the term of this patent is extended or adjusted under 35 U.S.C. 154(b) by 17 days.

(21) Appl. No.: 15/716,020

(22) Filed: Sep. 26, 2017

(65) Prior Publication Data
US 2018/0288795 A1    Oct. 4, 2018

Related U.S. Application Data

(60) Provisional application No. 62/479,891, filed on Mar. 31, 2017.

(51) Int. Cl.
*H04W 72/14* (2009.01)
*H04L 1/18* (2006.01)
(Continued)

(52) U.S. Cl.
CPC .......... *H04W 72/14* (2013.01); *H04L 1/1812* (2013.01); *H04W 72/042* (2013.01);
(Continued)

(58) Field of Classification Search
CPC ... H04W 72/14; H04W 74/08; H04W 72/042; H04W 88/08; H04W 88/02; H04L 1/1812
See application file for complete search history.

(56) References Cited

U.S. PATENT DOCUMENTS

2018/0123765 A1*  5/2018  Cao ................... H04L 1/1861
2018/0234839 A1*  8/2018  Tenny ................ H04L 63/123
2018/0270807 A1*  9/2018  Salem ............... H04W 72/0413

FOREIGN PATENT DOCUMENTS

EP          2264936 A2       12/2010

OTHER PUBLICATIONS

Zte et al., "HARQ for URLLC UL Grant-free transmission", 3GPP TSG RAN WG1 Meeting #88bis, Spokane, USA Apr. 3-7, 2017.
(Continued)

*Primary Examiner* — Hashim S Bhatti
(74) *Attorney, Agent, or Firm* — Harness, Dickey & Pierce, P.L.C.

(57) ABSTRACT

A system, apparatus, method, and non-transitory computer readable medium for providing transfer block indications in uplink (UL) grant-free transmissions may include a memory having computer readable instructions stored thereon, and at least one processor configured to execute the computer readable instructions to transmit a first transport block (TB) to a base station (BS) during a first transmission time interval (TTI) using a grant-free UL transmission, receive a UL grant from the BS in a physical downlink control channel (PDCCH) region during a time window, determine a target of the UL grant, the target including at least one of the first TB, a second TB, or a previously transmitted TB, based on the UL grant, and transmitting the target of the UL grant to the BS.

16 Claims, 8 Drawing Sheets

(51) Int. Cl.
  *H04W 72/04* (2009.01)
  *H04W 74/08* (2009.01)
  *H04W 88/02* (2009.01)
  *H04W 88/08* (2009.01)
(52) U.S. Cl.
  CPC ............ *H04W 74/08* (2013.01); *H04W 88/02* (2013.01); *H04W 88/08* (2013.01)

(56) References Cited

OTHER PUBLICATIONS

Lenovo, Motorola Mobility, "UL grant-free transmission for URLLC", 3GPP TSG RAN WG1 Meeting #88bis, Spokane USA Apr. 3-7, 2017.

International Search Report and Written Opinion thereof for corresponding International Application No. PCT/US2018/023939 dated Jun. 15, 2018.

* cited by examiner

METHODS, APPARATUSES, AND SYSTEMS FOR PROVIDING TRANSFER BLOCK INDICATION IN UPLINK GRANT-FREE TRANSMISSIONS

CROSS-REFERENCE TO RELATED APPLICATION

This U.S. non-provisional application claims the benefit of priority under 35 U.S.C. § 119(e) to U.S. provisional application No. 62/479,891, filed on Mar. 31, 2017, the entire content of which is incorporated herein by reference.

BACKGROUND

Field

Various example embodiments relate to methods, apparatuses, systems, and/or non-transitory computer readable media for providing transfer block indications in uplink (UL) grant-free transmissions. More specifically, the example embodiments are related to the use of non-scheduled UL grant-free transmissions for 5G Ultra Reliable Low Latency Communications (URLLC).

Description of the Related Art

Due to the increased demands for high speed wireless transfer speeds and ultra-reliable wireless transmissions, various proposals have been introduced to for next generation wireless protocols. For example, the 3rd Generation Partnership Project (3GPP) consortium is a partnership between various telecommunications associations, hardware manufacturers, wireless communications operators, and vendors, that establishes standards and protocols regarding various cellular telecommunications network technologies, including radio access, the core transport network, and service capabilities. Examples of 3GPP cellular telecommunications network standards include GSM, CDMA, 4G LTE, etc. A $5^{th}$ generation mobile network (5G) standard is currently being developed to provide higher capacity, higher reliability, and lower latency communications than the current 4G LTE standard. One goal of the 5G standard is to provide Ultra Reliable Low Latency Communications (URLLC), which provides for an average latency of 0.5 ms, and a reliability factor of $1-10^{-5}$ when transmitting a 32 byte packet within 1 ms. In order to achieve this URLLC requirement, various proposals have been submitted for supporting uplink (UL) transmissions schemes without "grant" for URLLC. UL grant-free transmissions can achieve lower latency and lower signalling overhead than grant-based transmissions because User Equipment (UE) devices do not need to send a scheduling request to a Base Station (BS) and wait for the BS to grant the UL before data transmission may begin. Additionally, the support for UL grant-free transmissions may allow for the achievement of the 5G URLLC reliability goal by reducing and/or eliminating potential errors caused by scheduling request and the resource grant process between the UE and the BS.

However, during the UL grant-free transmission process for a first transport block (TB) during one or a set of transmission time intervals (TTI), wherein a TTI could be a subframe, a slot, or a mini-slot, a UE may encounter a situation where the UE will receive a UL grant from a BS requesting a second TB while the UE is waiting for a response from the BS with regards to the first TB. This may cause an issue because under the current 5G proposals, the UE is prohibited from transmitting two or more TBs during the same TTI. Additionally, in this situation, the UE will be unable to determine whether the UL grant is related to the first TB, and therefore, requires the UE to resend the first TB to the BS using the received transmission schedule; or, if the BS has properly received and decoded the first TB and is now requesting that the next TB (e.g., the second TB) be transmitted using the UL grant; or, if the UL grant is related to a TB that was transmitted prior to the first TB transmission (e.g., if the first TB is the current TB, one or more TBs transmitted before the current TB). This situation may lead to increased transmission errors, reduced reliability, increased latency costs, and/or unnecessary resource consumption related to the UL grant. While one potential solution to this situation would be to only allow the UE to receive a single UL grant during a single TTI and to ignore all other UL grants, this solution is inefficient because it may provide poorer link adaptation and/or inefficient resource usage.

Accordingly, an approach is desired that allows a UE transmit two or more different TB s during a single TTI, and further allows the UE to determine whether a UL grant received during a time window requires the retransmission of a previously transmitted TB or the transmission of a new TB. Accordingly, the UE could either terminate the transmission of the ongoing TB to save on resource usage, and/or accept and/or follow the UL grant to retransmit the TB, which would provide more efficient link adaptation and resource adaptation over a grant-less TB transmission, and/ or transmit a new TB. All of these operations would enable more efficient transmission, and therefore lower latency.

SUMMARY

At least one example embodiment relates to a User Equipment (UE) device for providing transfer block indications in uplink (UL) grant-free transmissions.

In at least one example embodiment of the UE device, the UE device may include a memory having computer readable instructions stored thereon, and at least one processor configured to execute the computer readable instructions to transmit a first transport block (TB) to a base station (BS) during at least a first transmission time interval (TTI) using a grant-free UL transmission, receive a UL grant from the BS in a physical downlink control channel (PDCCH) region during a time window, determine a target of the UL grant, the target including at least one of the first TB, a second TB, or a previously transmitted TB based on the UL grant, and transmit the target of the UL grant to the BS.

Some example embodiments of the UE device provide that the at least one processor is further configured to analyze a transport block size (TBS) of the UL grant and a TBS of the transmitted first TB.

Some example embodiments of the UE device provide that the at least one processor is further configured to when the TBS of the UL grant is the same or is a next higher TBS value as the TBS of the transmitted first TB, retransmit the first TB to the BS based on the UL grant.

Some example embodiments of the UE device provide that the at least one processor is further configured to when the TBS of the response is not the same and is not a next higher TBS value as the TBS of the transmitted first TB, transmit the second TB to the BS based on the UL grant.

Some example embodiments of the UE device provide that the at least one processor is further configured to autonomously select a HARQ process ID for the grant-free UL transmission, and determine a number of bits associated with a new data indicator (NDI) included in the UL grant. When the determined number of NDI bits is 2, the at least one processor may perform at least one of: stopping transmission of the first TB using the grant-free UL transmission and determining whether to transmit a new TB based on a value of a different bit field included in the UL grant, the UL grant including the HARQ process ID that is selected by UE, retransmitting the first TB to the BS based on the UL grant, continuing transmission of the first TB using the grant-free UL transmission and retransmitting a previous TB scheduled for transmission prior to the first TB to the BS based on the UL grant, the UL grant including grant-based UL transmission scheduling information using a HARQ process ID selected by the BS, and continuing transmission of the first TB using the grant-free UL transmission and transmitting the second TB to the BS based on the UL grant.

Some example embodiments of the UE device provide that wherein when the determined number of NDI bits is 1, the at least one processor is further configured to determine the PDCCH region associated with the UL grant, and based on the determined PDCCH region and a value of the NDI bit, perform at least one of: stopping transmission of the first TB using the grant-free UL transmission and determining whether to transmit a new TB based on a value of a different bit field included in the UL grant, the UL grant including the HARQ process ID that is selected by the UE, retransmitting the first TB to the BS based on the UL grant, retransmitting the previous TB to the BS based on the UL grant, and transmitting the second TB to the BS based on the UL grant.

Some example embodiments of the UE device provide that when results of the determination indicate that the second TB is to be transmitted, the at least one processor is configured to transmit the second TB to the BS based on the UL grant as a URLLC data packet or an eMBB data packet.

Some example embodiments of the UE device provide that when the UL grant is received in a predefined or a configured timing after the first TTI of transmitting the first TB, the at least one processor is configured to retransmit the first TB to the BS based on the UL grant or transmit the second TB to the BS based on the UL grant.

At least one example embodiment relates to a Base Station (BS) device for providing transfer block indications in UL grant-free transmissions.

In at least one example embodiment of the BS device, the BS device may include a memory having computer readable instructions stored thereon, and at least one processor configured to execute the computer readable instructions to receive a first transport block (TB) from a User Equipment (UE) during a first transmission time interval (TTI) using a grant-free UL transmission, determine whether to provide a UL transmission grant to the UE, transmit a UL grant to the UE in a physical downlink control channel (PDCCH) region during a time window, the UL grant indicating results of the determination of the UL transmission grant status, and receive at least one of the first TB, a second TB, or a previously transmitted TB from the UE based on the UL transmission grant status.

Some example embodiments of the BS device provide that the at least one processor is further configured to determine a transport block size (TBS) of the UL grant based on a TBS of the received first TB and results of the determination of the UL transmission grant status.

Some example embodiments of the BS device provide that the at least one processor is further configured to when the determined TBS of the UL grant is the same or is a next higher TBS value as the TBS of the received first TB receive a retransmission of the first TB from the UE based on the transmitted UL grant.

Some example embodiments of the BS device provide that the at least one processor is further configured to when the determined TBS of the UL grant is not the same and is not a next higher TBS value as the TBS of the received first TB, receive the second TB from the UE based on the transmitted UL grant.

Some example embodiments of the BS device provide that the at least one processor is further configured to select a HARQ process ID, set a bit length associated with a new data indicator (NDI), set a value for the NDI bits, the value of the NDI bits causing the UE to perform at least one of: stop transmission of the first TB using the grant-free UL transmission, retransmit the first TB to the BS based on the transmitted UL grant, continue transmission of the first TB using the grant-free UL transmission and retransmit a previous TB scheduled for transmission prior to the first TB to the BS based on the transmitted UL grant, the transmitted UL grant including grant-based UL transmission scheduling information using the selected HARQ process ID, and continue transmission of the first TB using the grant-free UL transmission and transmit the second TB to the BS based on the transmitted UL grant; and transmit the UL grant to the UE, the UL grant including the NDI bits and the selected HARQ process ID.

Some example embodiments of the BS device provide that when the set number of NDI bits is 1, the at least one processor is further configured to select the PDCCH region associated with the UL grant, set a value for the NDI bit, the set value of the NDI bit and the selected PDCCH region causing the UE to perform at least one of: stop transmission of the first TB using the grant-free UL transmission and determine whether to transmit a new TB based on a value of a different bit field included in the UL grant, the UL grant including the HARQ process ID that was selected by the UE, retransmit the first TB to the BS based on the transmitted UL grant, retransmit the previous TB to the BS based on the transmitted UL grant, and transmit the second TB to the BS based on the transmitted UL grant.

Some example embodiments of the BS device provide that the second TB is transmitted from the UE as a URLLC data packet or an eMBB data packet.

At least one example embodiment relates to a method of providing transfer block indications in UL grant-free transmissions.

In at least one example embodiment of the method, the method may include transmitting a first transport block (TB) to a base station (BS) during a first time transmission interval (TTI) using a grant-free UL transmission, receiving a UL grant from the BS in a physical downlink control channel (PDCCH) region during a time window, the UL grant indicating whether the BS grants UL transmission, determining a target of the UL grant, the target including at least the first TB or a second TB based on the UL grant, and transmitting the target of the UL grant to the BS.

Some example embodiments of the method include analyzing a transport block size (TBS) of the UL grant and a TBS of the transmitted first TB.

Some example embodiments of the method provide that when the TBS of the UL grant is the same or is a next higher TBS value as the TBS of the transmitted first TB, the method includes retransmitting the first TB to the BS based on the UL grant.

Some example embodiments of the method provide that when the TBS of the UL grant is not the same and is not a next higher TBS value as the TBS of the transmitted first TB, the method includes transmitting the second TB to the BS based on the UL grant.

Some example embodiments of the method include autonomously selecting a HARQ process ID for the grant-free UL transmission, and determining a number of bits associated with a new data indicator (NDI) included in the UL grant. When the determined number of NDI bits is 2, the method may include performing at least one of: stopping transmission of the first TB using the grant-free UL transmission and determining whether to transmit a new TB based on a value of a different bit field included in the UL grant, the UL grant including the HARQ process ID that is selected by UE, retransmitting the first TB to the BS based on the UL grant, continuing transmission of the first TB using the grant-free UL transmission and retransmitting a previous TB scheduled for transmission prior to the first TB to the BS based on the UL grant, the UL grant including grant-based UL transmission scheduling information using a HARQ process ID selected by the BS, and continuing transmission of the first TB using the grant-free UL transmission and transmitting the second TB to the BS based on the UL grant.

Some example embodiments of the method provide that when the determined number of NDI bits is 1, the method includes determining the PDCCH region associated with the UL grant, and based on the determined PDCCH region and a value of the NDI bit, performing at least one of stopping transmission of the first TB using the grant-free UL transmission and determining whether to transmit a new TB based on a value of a different bit field included in the UL grant, the UL grant including the HARQ process ID that is selected by the UE, retransmitting the first TB to the BS based on the UL grant, retransmitting the previous TB to the BS based on the UL grant, and transmitting the second TB to the BS based on the UL grant.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular data types. The program modules and functional processes discussed herein may be implemented using existing hardware in existing communication networks. For example, program modules and functional processes discussed herein may be implemented using existing hardware at existing network elements or control nodes. Such existing hardware may include one or more digital signal processors (DSPs), application-specific-integrated-circuits, field programmable gate arrays (FPGAs) computers or the like.

Various example embodiments will be discussed with reference to the upcoming 3rd Generation Partnership Project (3GPP) 5$^{th}$ Generation (5G) protocol, however, the example embodiments are not limited thereto. For example, the example embodiments may be utilized in conjunction with Radio Access Networks (RANs) such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (Wi-MAX); Ultra Mobile Broadband (UMB); 3GPP LTE; 3GPP 5G (5$^{th}$ Generation); etc.

At least one example embodiment refers to a new scenario in 5G NR where grant-free and grant-based transmissions may occur at the same time, i.e. simultaneously, for a single, individual user equipment (UE). The related, i.e., corresponding, new data indicator (NDI) scheduling indication from the base station (BS) is then not just for a grant-free or just for a grant-based UL transmission, but may be a scheduling indication for mixed traffic. According to at least some example embodiments, a shared HARQ process is proposed for both types of transmissions (e.g., grant-free and grant-based UL transmissions) and 2-bit NDIs may be used to indicate the transmission types. Thus, a redefinition and new extension of NDI is proposed to enable flexible and mixed case usage scenarios in 5G, e.g., when there are both enhanced Mobile Broadband (eMBB) and URLLC data to be transmitted at the same time from one UE.

Figure 1:
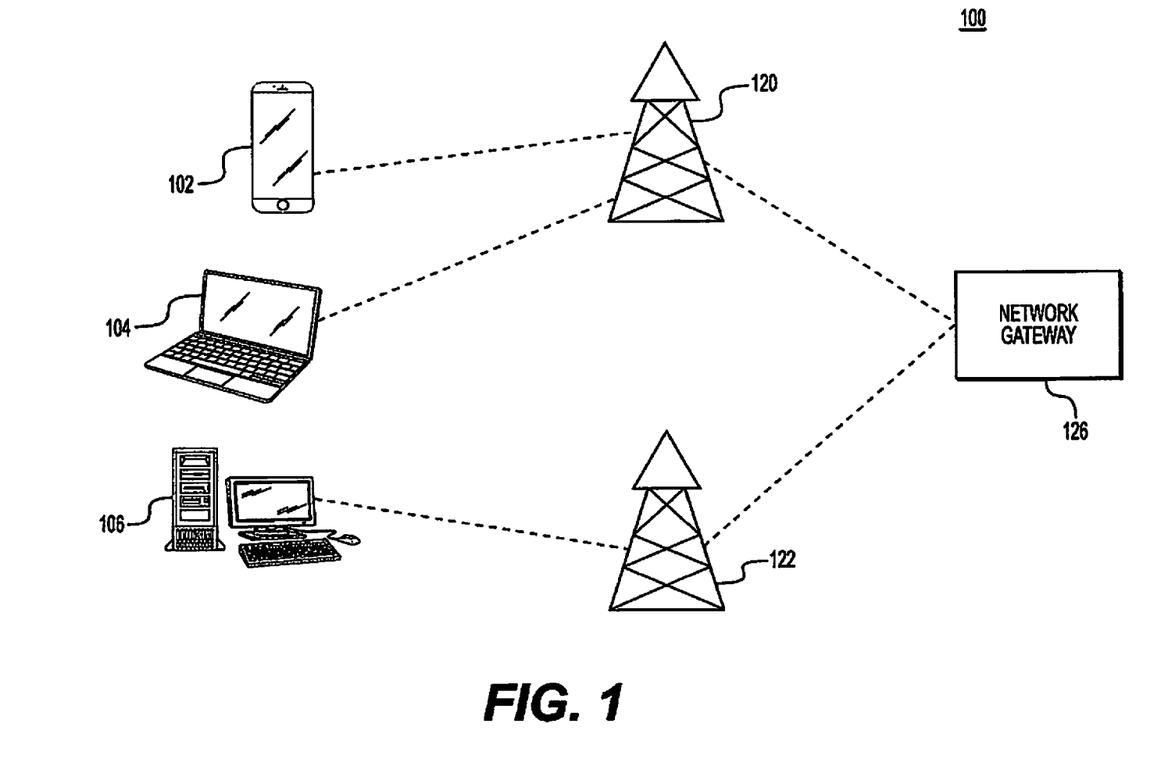
FIG. 1 illustrates a wireless communication system according to at least one example embodiment.

FIG. 1 illustrates a wireless communication system, according to at least one example embodiment. As shown in FIG. 1, a communication system 100 includes user equipment (UEs) 102, 104, and 106, base stations (BSs) 120 and 122, as well as the network gateway 126. The UEs 102, 104, and 106, and the BSs 120 and 122 may be connected over a wireless network, such as a cellular wireless access network (e.g., a 3G wireless access network, a 4G-Long Term Evolution (LTE) network, a next generation (e.g., 5G) wireless network, etc.), a WiFi network, a WiMAX network, etc. The BSs 120 and 122 may connect to the network gateway 126 over a wired and/or wireless network.

Each of the UEs 102, 104, and 106 may be any one of, but not limited to, a mobile device, a tablet, a laptop computer, a desk top computer and/or any other type of stationary or portable device capable of establishing communication via one or more wireless network to the Internet and/or other devices.

While FIG. 1 only illustrates three UEs, 102, 104, and 106, the number of UEs in the communication system 100 is not limited thereto and may include any number of UEs that are the same or different from the UEs 102, 104, and 106, as described above. Additionally, while FIG. 1 only illustrates two BSs 120 and 122, the number of BSs in the communication system 100 is not limited thereto and may include any number of BSs that are the same or different from the BSs 120 and 122.

The communication system 100 further includes one or more base stations such as BSs 120 and 122. The BSs 120 and 122 may operate according to the underlying cellular wireless access technology. For example, if the UEs 102, 104, and 106 are 5G-enabled devices, then the BSs 120 and 122 are g-NodeBs (gNB) or other 5G-based cell base stations, however the example embodiments are not limited thereto.

In at least one example embodiment, the UEs 102, 104, and 106 may communicate and/or transmit data to and from the network gateway 126 via the BSs 120 and 122. The network gateway 126 facilitates the communication of UEs 102, 104, 106 and 108 with other devices, entities, etc., over a back-end network, such as the Internet, etc.

While certain components of the home network and the cellular wireless network are shown as part of the communication system 100, example embodiments are not limited thereto. Each of the home network and the cellular wireless access network may include components other than that shown in FIG. 1, which are necessary and/or beneficial for operation of the underlying networks within the communication system 100, such as access points, switches, routers, nodes, etc.

Figure 2A:
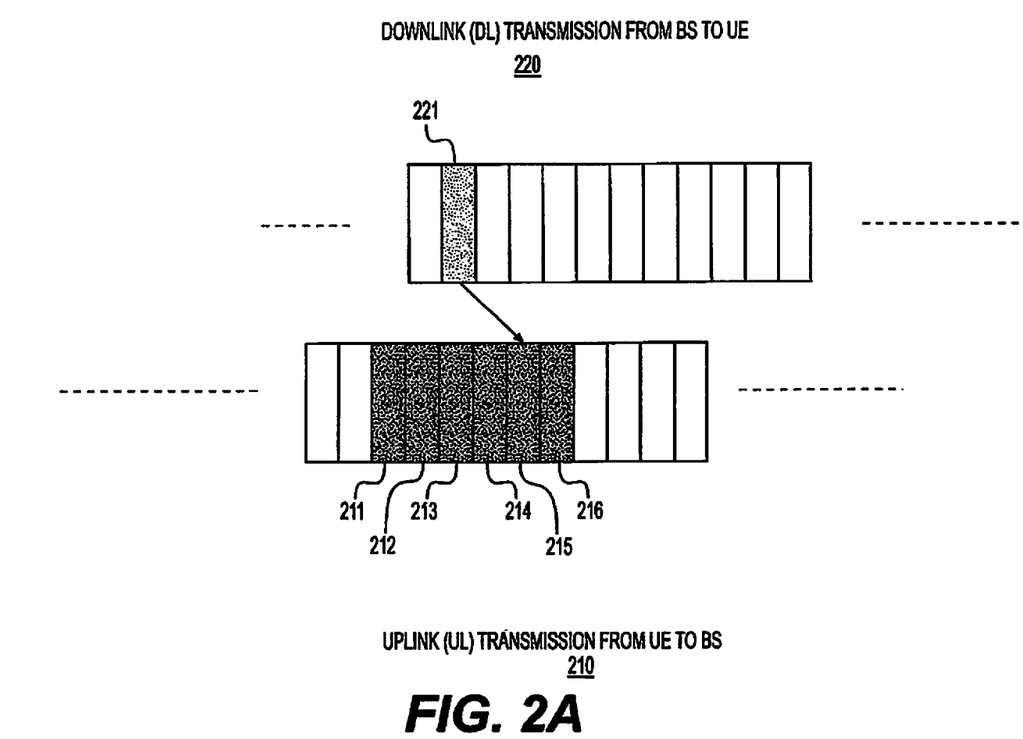
FIG. 2A illustrates a transmission flow diagram illustrating an uplink (UL) grant-free transmission scenario according to the related art.

FIG. 2A illustrates a transmission flow diagram illustrating an uplink (UL) grant-free transmission scenario according to the related art. As shown in FIG. 2A, there is illustrated a UE transmission time slot diagram 210 and a BS transmission time slot diagram 220. The UE transmission time slot diagram 210 may represent the UL transmissions of a UE, such as UEs 102, 104, or 106, and the BS transmission time slot diagram 220 may represent the downlink (DL) transmission of a BS, such as BS 120 or 122. During the UL grant-free transmission, the TTI period of the UE may be set to be K repetitions, where K is a natural number. In FIG. 2, the TTI period is set to 6 repetitions (e.g., slot 211 to slot 216) where each repetition occupies one time slot, however the example embodiments are not limited thereto. For example, at slot 211, the UE may initiate the UL grant-free transmission of a first TB or TB#1 (e.g., a block of data stored in a transmission buffer of the UE). Under the UL grant-free transmission procedure, the UE will repeat the UL grant-free transmission of the first TB until the UE receives an acknowledgement of successful reception of the TB from the BS, until the number of repetitions of the transmission equals the K value, or a UL grant is received for the same TB.

However, at slot 221, a BS may transmit a UL grant to schedule the transmission or retransmission of a different TB (e.g., a second TB or TB#2) to the UE. Then, the UE may receive the transmitted UL grant for the second TB while still in the TTI for transmitting the first TB (e.g., slot 215). Accordingly, there is a need for a method to analyze the received UL grant and determining which type of TB is being scheduled.

Figure 2B:
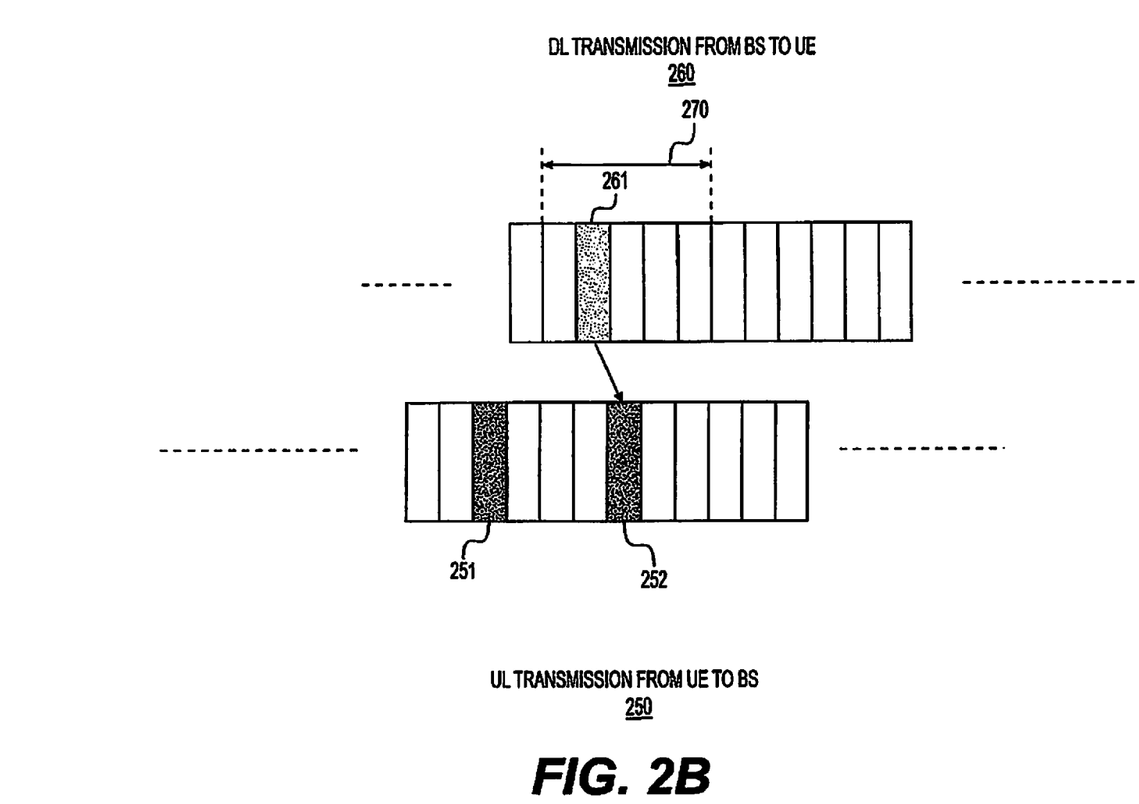
FIG. 2B illustrates another transmission flow diagram illustrating an UL grant-free transmission in another transmission scenario according to the related art.

FIG. 2B illustrates another transmission flow diagram illustrating a UL grant-free transmission in another transmission scenario according to the related art. In FIG. 2B, there is illustrated a UE transmission time slot diagram 250 and a BS transmission time slot diagram 260. As shown in FIG. 2B, a UE transmits a UL grant-free TB#1 using only one repetition, i.e., K=1, at slot 251. In this scenario, the UE is configured to expect a possible UL-grant for scheduling the retransmission of TB#1 from the BS within a predefined time window 270 after the TB transmission (e.g., TB#1). However, the BS may transmit to the UE a UL grant response during this same time window 270, the UL grant response providing scheduling for the transmission of a different TB (e.g., a TB#2, a second TB, a next TB, etc.) or retransmission of a previously transmitted TB (e.g., a TB that was transmitted prior to TB#1). Consequently, there is a need for a method for analyzing the received UL grant and determining the desired type of TB being scheduled.

Figure 3:
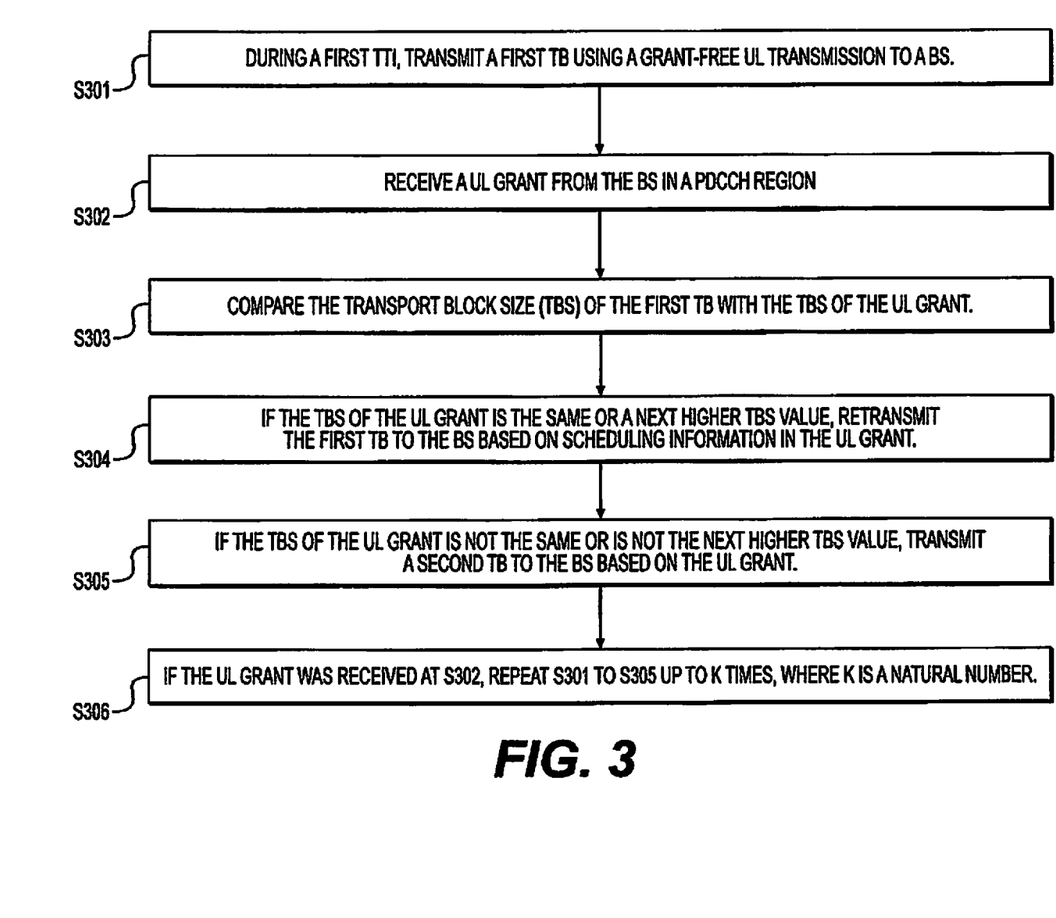
FIG. 3 is a flowchart illustrating a first method for providing transfer block indications in UL grant-free transmissions according to at least one example embodiment.
Figure 4:
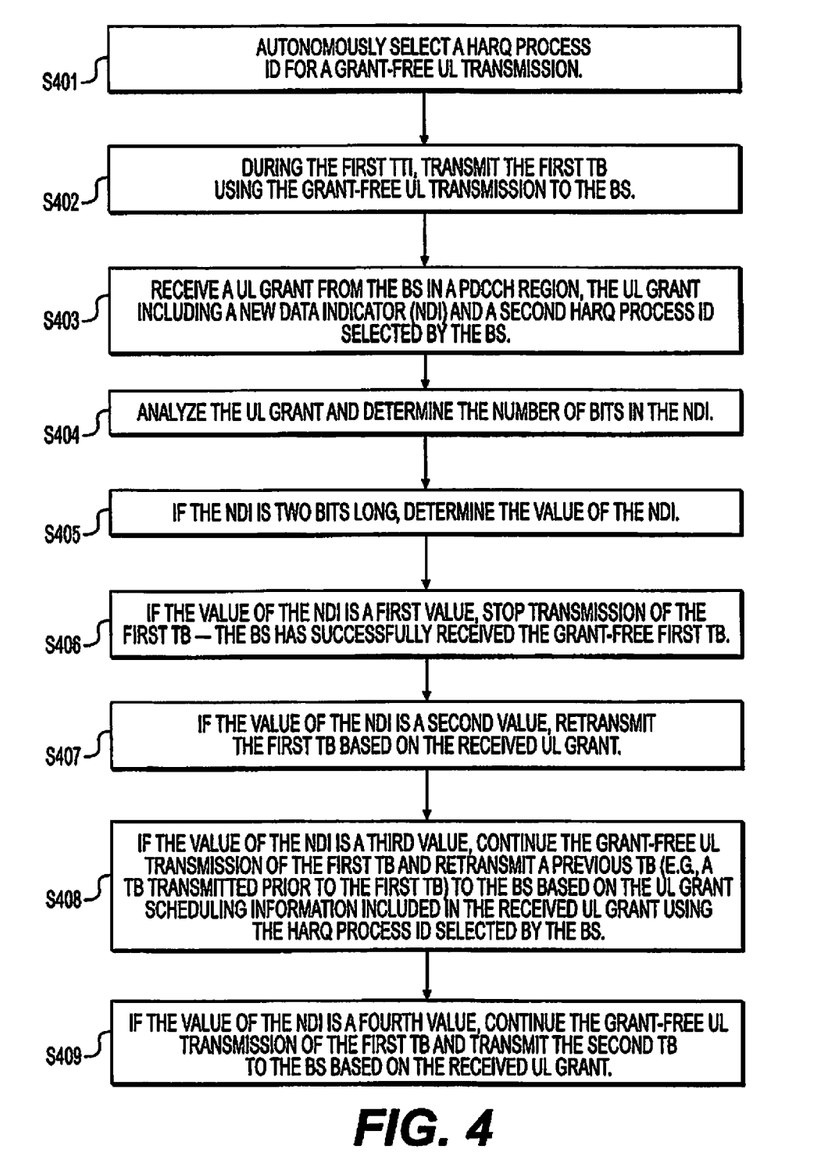
FIG. 4 is a flowchart illustrating a second method for providing transfer block indications in UL grant-free transmissions according to at least one example embodiment.
Figure 5:
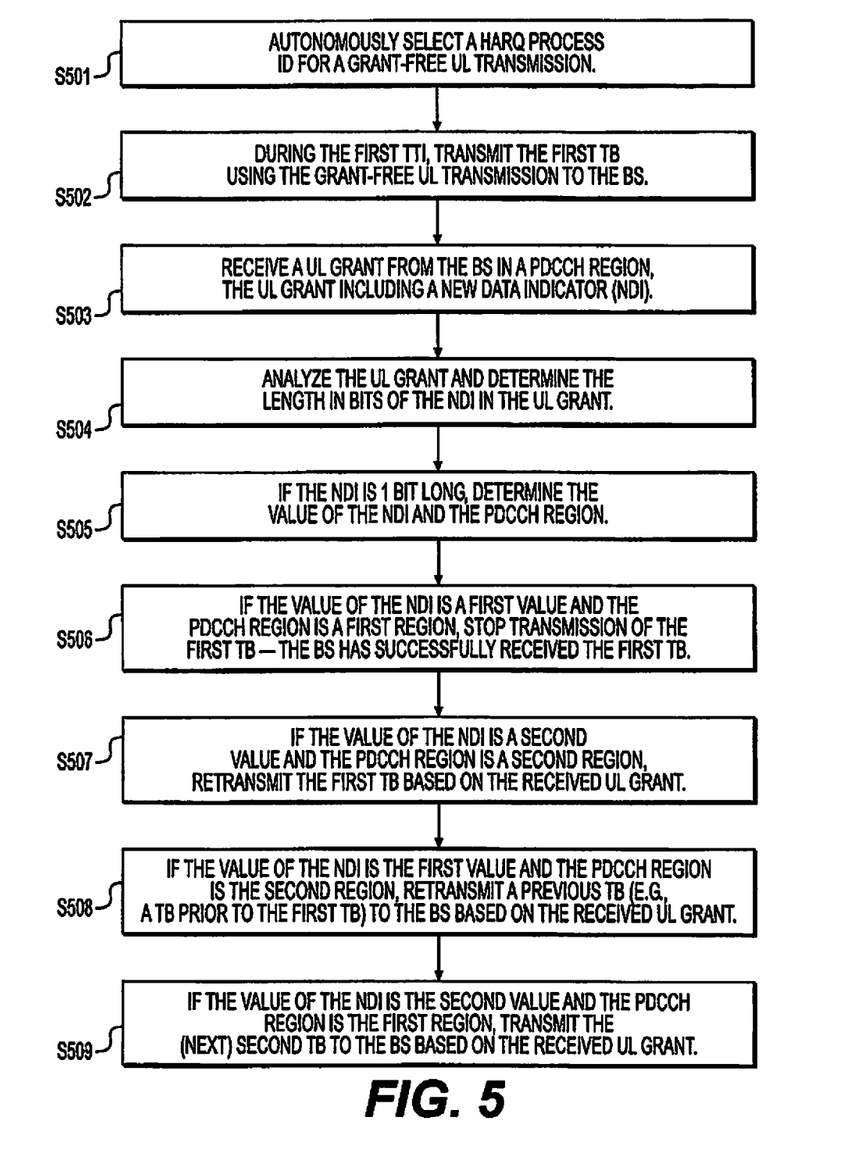
FIG. 5 is a flowchart illustrating a third method for providing transfer block indications in UL grant-free transmissions according to at least one example embodiment.

FIGS. 3 to 5 illustrate various methods for analyzing the received UL grant and determining the desired type of TB is being scheduled according to some example embodiments. The methods illustrated in FIGS. 3, 4, and 5 may be executed as the operations of any one of the UEs 102, 104, and 106 in conjunction with the other devices illustrated in FIG. 1. However, it should be noted that any appropriate UE may operate the method described below.

Referring to FIG. 3, a method for analyzing the received UL grant and determining the desired type of TB being scheduled according to at least one example embodiment is shown. In operation S301, a UE may transmit a first TB using grant-free UL transmission as part of a URLLC data packet transmission to at least one BS during a first TTI. The TTI may be of a desired time interval and the transmission of the first TB using UL transmission may be repeated up to K times, where K is a natural number and is configurable, before beginning transmission of the next TB, or second TB, stored in a transmission buffer of the UE in the next TTI (e.g., a second TTI). For example, as shown in FIG. 2, the K may be set as 6 TTI, but the example embodiments are not limited thereto. The TB may include data packets stored in a transmission buffer of the UE. In some example embodiments, the TB may be a URLLC data packet, an enhanced Mobile Broadband (eMBB) data packet, etc., however the example embodiments are not limited thereto. Additionally, based on instructions received from the BS, the UE may convert TBs to be transmitted from a first data packet type, e.g., URLLC data packets, to a second data packet type, e.g., eMBB data packets.

In operation S302, the UE may receive a UL grant response in a physical downlink control channel (PDCCH) region from the at least one BS during the K repetitions, as illustrated in FIG. 2A, or during a predefined time window, as illustrated in FIG. 2B. In order to allow the UE to determine which type of TB is being scheduled, according to at least one example embodiment, the BS may use a transport block size (TBS) to indicate the type of TB to be scheduled. Examples of the different TB scheduling types include scheduling a grant-free old TB, wherein the previously transmitted TB (e.g., the first TB) is re-transmitted again using the grant-free transmission; a grant-based old TB, wherein the current TB or a previously transmitted TB (e.g., the first TB or a TB that was transmitted before the first TB), is transmitted based on the UL grant scheduling from the BS; and a grant-based new TB, wherein a new TB (e.g., a second TB, or next TB), is to be transmitted to the BS using the UL grant scheduling from the BS. This new TB may be the same data packet type as the old TB (e.g., if the old TB was a URLLC data packet, the new TB may be a URLLC data packet, etc.), or the new TB may be converted to a different data packet type (e.g., if the old TB was a URLLC data packet, the new TB may be converted to a eMBB data packet, etc.) based on an instruction from the BS included in the UL grant response. While three TB scheduling types are listed, the example embodiments are not limited thereto and may include additional TB scheduling types may be provided.

According to some example embodiments, the BS may select a desired TB scheduling type from the plurality of TB scheduling types, and then indicate the desired type to the UE using the TBS of the UL grant response. The BS may generate and transmit a UL grant response to the UE, and the UE may determine the TB scheduling type based on the TBS set by the BS to be used for the UL grant transmissions, however the example embodiments are not limited thereto and the BS may provide the desired TB scheduling type using other means, such as the means described in connection with FIGS. 4 and 5 below.

In operation S303, the UE may determine the desired TB scheduling type to use by analyzing the TBS of the UL grant response and comparing the transport block size (TBS) of the UL grant response with the TBS of the initially transmitted first TB.

In operation S304, if the UL grant response includes an explicit or implicit indication that the transport block size (TBS) is the same TBS as the TBS used by the UE to transmit the grant free UL first TB to the BS, or that the TBS to be used is one size larger than the initial TBS used by the UE to transmit the first TB, then the desired TB scheduling type is the grant-free old TB scheduling type and the UE will retransmit the first TB based on the scheduling information in the UL grant.

In operation S305, if the UL grant response includes an explicit or implicit indication that the TBS to be used is not the same TBS as the initial TBS, or is not the next size larger TBS than the initial TBS, then the UE may transmit the second TB to the BS based on the UL grant scheduling information included in the UL grant response.

In operation S306, if no UL grant response was received during the time slot at S302, the UE may repeat operations S301 to S305 up to the set K times. If the UE has transmitted the first TB K times, the UE may then transmit the next TB (e.g., the second TB) stored in the transmission buffer of the UE during a second TTI.

Additionally, according to some example embodiments, if the UE receives the UL grant during a desired (and/or predefined) timing (e.g., a timing window, etc.) or a pre-configured timing window after the transmission of the first TB during the first TTI, the UE may retransmit the first TB to the BS based on the received UL grant information, or transmit the second TB to the BS based on the received UL grant information.

While FIG. 3 illustrates one method of using the TBS to indicate the desired TB scheduling type, the example embodiments are not limited thereto, and other methods may be used to indicate the desired TB scheduling type based on the TBS. For example, other example embodiments may use different desired TBS sizes (e.g., a next lower TBS size, etc.) to determine whether the UE is to transmit the first TB or the second TB to the BS based on the UL grant scheduling information.

Referring to FIG. 4, according to at least one example embodiment, the desired TB scheduling type may be determined based on analysis of a bit and/or bits filled in the UL grant, e.g., a new data indicator (NDI) value. For example, a standard NDI may be one bit long. However, in some example embodiments, the NDI bit length may be greater than one bit (e.g., two or more bits). In example embodiments where the NDI bit is at least two bits, the BS may use the NDI bits to indicate the desired TB scheduling type to be used by the UE and/or indicate the status of the previous TB transmission.

In operation S401, the UE may autonomously (and/or independently) select a Hybrid Automatic Repeat Request (HARQ) process ID to be shared between grant-free and grant-based transmission from the UE to the BS. HARQ is used as an error control process for correcting error packets transmitted in the PHY layer between the UE and the BS. The HARQ process ID is used to identify the HARQ process being used by the UE and/or the BS and to identify a transmitted TB. According to some example embodiments, the HARQ process ID may be served as a payload and transmitted in the grant-free TB transmission, and/or could be known by the BS from an implicit mapping, e.g., a HARQ process ID mapped to a transmission starting slot index.

In operation S402, the UE may transmit the first TB using the grant-free UL transmission to the BS during the first TTI, similar to operation S301. In operation S403, the UE receives a UL grant response from the BS in a PDCCH region. The UL grant response includes the NDI and a second HARQ process ID that has been selected by the BS.

At operation S404, the UE will analyze the UL grant response and determine the number of bits (e.g., the length) in the NDI. At operation S405, if the NDI bit length is two bits long, the UE will determine the value of the NDI.

In operation S406, if the UE determines that the NDI bit value is a first value (e.g., NDI="00"), the UE will stop transmission of the first TB because the BS has successfully received the initial grant-free old TB transmission and indicates that the UE may stop transmitting the old TB (e.g., the first TB). In other words, if the BS transmits an NDI having the first value, this is an acknowledgement of successful transmission of the initial grant-free old TB. In this case, the HARQ process ID is transmitted in the UL grant (e.g., the UL grant response) and the HARQ process ID is set to be the process ID that is detected from the grant-free old TB or from the implicit mapping. Additionally, the UE may determine whether the purpose of the UL grant is to acknowledge the successfully transmission (e.g., detection) of the grant free old TB, or whether the UL grant is the acknowledgment of the successful transmission of the grant free old TB while also including a scheduling instruction for a new TB. According to some example embodiments, this may be achieved, for example, by indicating a special modulation coding scheme (MCS) level in the UL grant (e.g., the MCS level is a desired value, etc.), whereby the UE will determine that the UL grant is only for acknowledgement, and otherwise the UL grant will also schedule a new transmission.

In operation S407, if the UE determines that the NDI bit value is a second value (e.g., NDI="01"), the UE will retransmit the first TB based on the scheduling information received from the BS because the BS has not detected the grant-free old TB. In other words, if the BS transmits an NDI having the second value, this is an instruction from the BS to the UE to (re)transmit the data included in the previously transmitted grant-free old TB based on the received UL grant scheduling information, including the HARQ process ID that was selected by the BS and indicated in the UL grant scheduling information. In this case, the HARQ process ID in the UL grant could be a random value, because the BS did not detect the previous grant-free TB transmission, or could be a HARQ process ID deduced from the implicit mapping.

In operation S408, if the UE determines that the NDI bit value is a third value (e.g., NDI="10"), the UE will continue the grant-free UL transmission of the first TB to the BS, and will also transmit the previous TB (e.g., the TB scheduled to be transmitted to the BS prior to the grant-free UL transmission of the first TB) to the BS based on the received UL grant scheduling information. The grant-based TB of the previous TB is a grant based old TB and the BS that will use the previously allocated HARQ process ID (e.g., the HARQ process ID allocated by the BS) and the third value NDI to identify this desired TB scheduling type. In other words, if the BS transmits an NDI having the third value, this is an instruction to the UE to retransmit the previous grant based TB identified by the HARQ process ID in the UL grant.

In operation S409, if the UE determines that the NDI bit value is a fourth value (e.g., NDI="11"), the UE will continue the grant-free UL transmission of the first TB to the BS, and will also transmit a new TB (e.g., a second TB, the next TB, etc.) to the BS based on the UL grant scheduling information. This second TB is a grant based new TB (e.g., not a previously transmitted TB) and the BS will allocate a HARQ process ID to identify this TB. In other words, if the BS transmits an NDI having the fourth value, this is an instruction to the UE to transmit a new TB based on this UL grant, while also continuing the grant-free transmission of the first TB. The HARQ process ID in the grant identifies the TB. The UE will continue the grant-free old TB transmission. As another option, according to some example embodiments, the UE determines whether to terminate or continue the transmission of grant-free old TB based on an explicit indication.

One advantage to using an NDI bit length that is greater than one bit to determine the desired TB scheduling type is that it allows the same TBS to be used for multiple TB transmissions in the same TTI window.

While various NDI values have been discussed in connection with FIG. 4, the example embodiments are not limited thereto and other NDI values may be used to indicate the TB scheduling types and/or additional TB scheduling types.

Referring now to FIG. 5, according to at least one example embodiment, the desired TB scheduling type may be determined based on analysis of the new data NDI value and the PDCCH region identified in the UL grant response from the BS. The PDCCH is a channel that is used to carry downlink control information (DCI) related to the data being transmitted on the current subframe, and information regarding the resources which the UE needs to use for the uplink data transmitted between the UE to the BS. The DCI includes the resource assignments for the UE that have been assigned by the BS. In other words, the UL grant is carried by a DCI and transmitted in a PDCCH region. According to some example embodiments, the BS may determine the desired TB scheduling type and inform the UE by using a desired PDCCH region and setting a desired NDI value. The PDCCH region is separately configured for transmitting URLLC and eMBB TBs, and the configuration is either in the time domain or in the frequency domain, or in both.

For example, in operation S501, the UE may autonomously select a HARQ process ID for a grant-free UL transmission, similar to operation S401 of FIG. 4. The UE may autonomously select the HARQ process ID based on a desired rule (e.g., a predefined rule, etc.) for grant-free UL transmissions according to some example embodiments. In operation S502, the UE may transmit the first TB using the grant-free UL transmission to the BS during the first TTI, similar to operation S402 and S301. In operation S503, the UE will receive a UL grant response from the BS in a designated PDCCH region selected by the BS which allows, in part, the UE to determine the desired TB scheduling type. The UL grant response will also include an NDI that is selected by the BS to help indicate the desired TB scheduling type. According to various example embodiments, the NDI may have a length of one bit.

At operation S504, the UE will analyze the received UL grant response and will also determine the PDCCH region of the UL grant response at operation S505.

At operation S506, if the value of the NDI is a first value (e.g., NDI="0") and the PDCCH region is a first region (e.g., PDCCH region 1), the UE will stop transmission of the first TB because the BS has successfully received the first TB, similar to operation S406. Also similarly, the HARQ process ID is transmitted in the UL grant and is set by the BS to be the HARQ process ID that was detected from the grant-free old TB, or from the implicit mapping. Additionally, the UE may determine whether this UL grant is for acknowledging the successful transmission (e.g., detection) of the grant free old TB by the BS, or that the UL grant response also includes the scheduling of a new TB transmission. According to some example embodiments, this may be achieved, for example, by indicating a special MCS level in the UL grant, which allows the UE to determine whether this UL grant is just for acknowledgement, or also includes schedule information for a new transmission. However, the example embodiments are not limited thereto, and other information/indicators may be included in the UL grant that may be used to convey this information.

At operation S507, if the value of the NDI is a second value (e.g., NDI="1") and the PDCCH region is a second region (e.g., PDCCH region 2), the UE will determine that the desired TB scheduling type is the grant-free old TB type, and will retransmit the first TB using the grant-free transmission, similar to S407.

At operation S508, if the value of the NDI is the first value (e.g., NDI="0") and the PDCCH region is the second region (e.g., PDCCH region 2), the UE will determine that the desired TB scheduling type is the grant-based old TB type, and will retransmit the first TB using the grant-based UL transmission scheduling, similar to S408.

At operation S509, if the value of the NDI is the second value (e.g., NDI="1") and the PDCCH region is the first region (e.g., PDCCH region 1), the UE will determine that the desired TB scheduling type is the grant-based new TB, and will transmit the next TB (e.g., the second TB) using the grant-based UL transmission scheduling, similar to operation S409.

While various NDI values and PDCCH regions have been discussed in connection with FIG. 5, the example embodiments are not limited thereto and other NDI values and/or PDCCH regions may be used to indicate the TB scheduling types and/or additional TB scheduling types.

Figure 6:
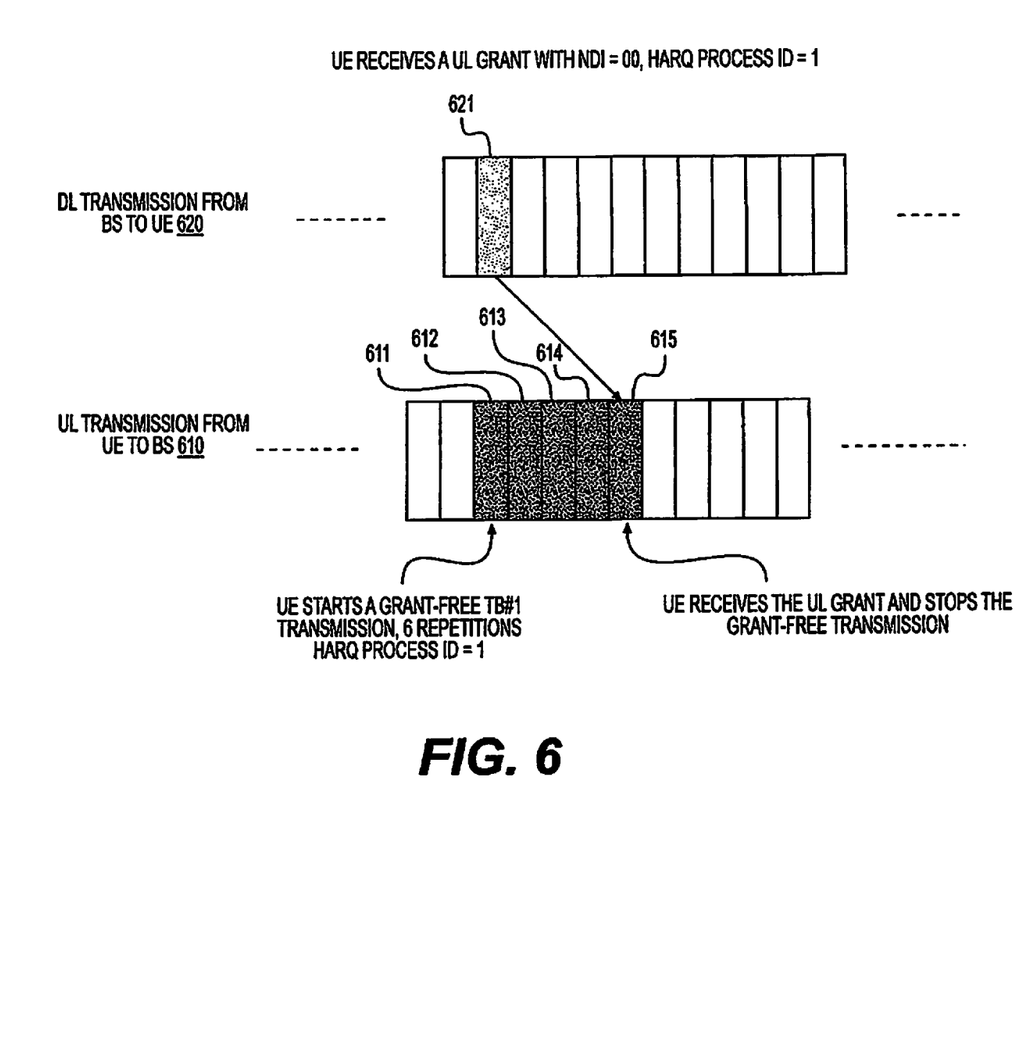
FIG. 6 illustrates a transmission flow diagram between a user equipment (UE) and a base station (BS) according to at least one example embodiment.

Now referring to FIG. 6, FIG. 6 illustrates a transmission flow diagram between a UE device and a BS corresponding to operations S401 to S406 of FIG. 4. FIG. 6 illustrates a UL transmission from an example UE to an example BS as element 610, and the DL transmission (e.g., the UL grant response) from the example BS to the example UE as element 620. In this example, the repetition K value has been set to 6 repetitions and the UE has autonomously selected a HARQ process ID of 1, however the example embodiments are not limited thereto and other K and other HARQ process IDs may be used. As illustrated in FIG. 6, at time slot 611, the UE initiates and/or starts a grant-free UL transmission of the first TB (e.g., TB#1). At time slot 621, the BS transmits the UL grant response to the UE, the UL grant response including a NDI equal to "00", and with the HARQ process ID of 1. Meanwhile, at time slots 612 to 614, the UE continues to retransmit the grant-free UL transmission of the first TB because the UE has not received the UL response from the BS. At time slot 615, the UE receives the UL grant response transmitted by the BS at time slot 621. Because the UL grant response indicates that the NDI is equal to "00", the UE determines that the instruction from the BS is to stop transmission of the first TB because the BS has successfully received the initial grant-free old TB transmission of the first TB. Accordingly, because the UE is able to determine that the BS has successfully received the grant-free UL transmission before the TTI window has closed, the UE may transmit the next TB in its transmission buffer. This results in improved efficiency, improved latency, and better utilization of the UE and BS resources.

Figure 7:
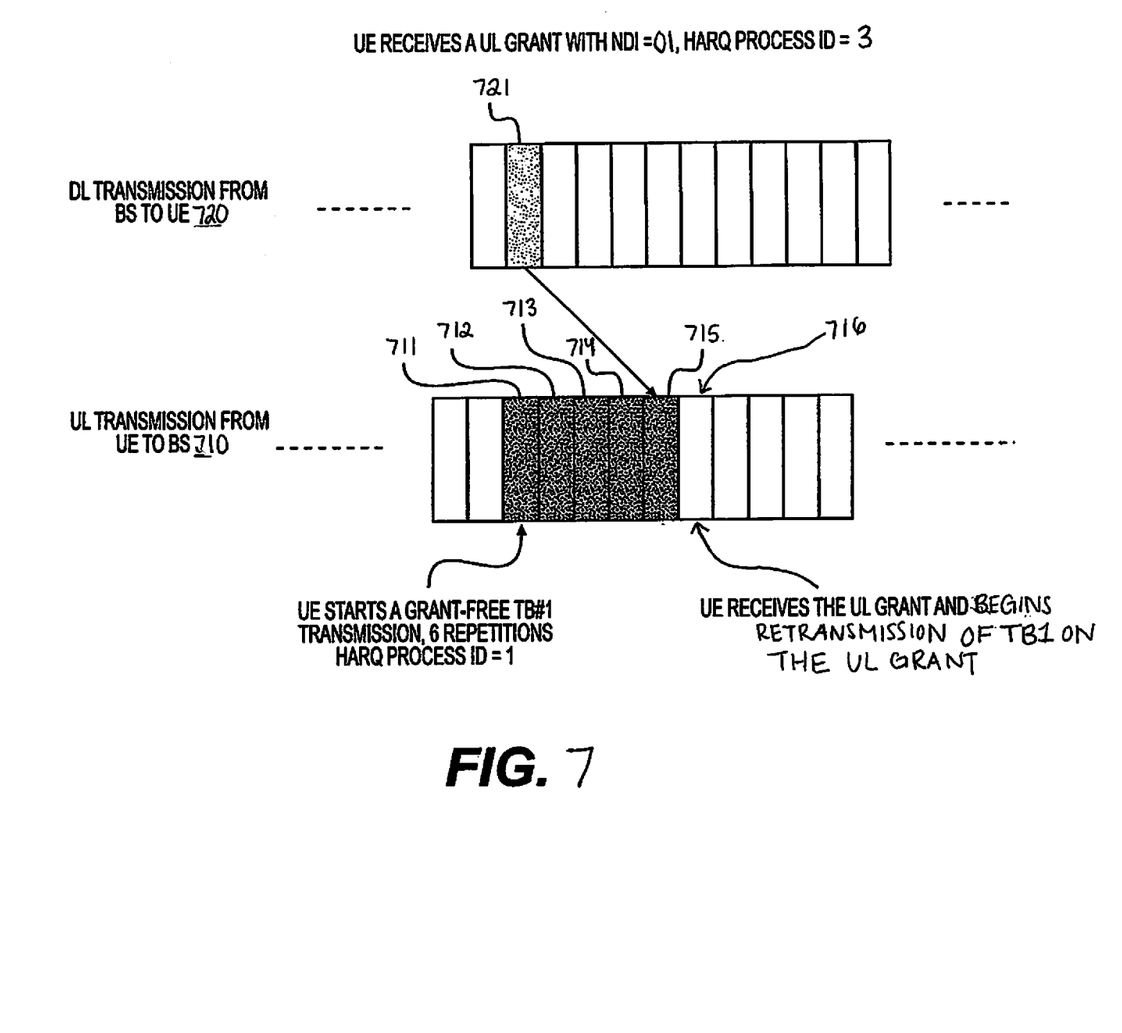
FIG. 7 illustrates a second transmission flow diagram between a UE and a BS according to at least one example embodiment.

FIG. 7 illustrates a transmission flow diagram between a UE device and a BS corresponding to operations S401 to S405 and S409 of FIG. 4. Similar to FIG. 6, FIG. 7 illustrates a UL transmission from an example UE to an example BS as element 710, and the DL transmission (e.g., the UL grant response) from the example BS to the example UE as element 720. At time slot 711, the UE initiates and/or starts a grant-free UL transmission of the first TB (e.g., TB#1). At time slot 721, the BS transmits the UL grant response to the UE, the UL grant response including a NDI equal to "01", and with the BS selected HARQ process ID of 3. Meanwhile, at time slots 712 to 714, the UE continues to retransmit the grant-free UL transmission of the first TB because the UE has not received the UL response from the BS. At time slot 715, the UE receives the UL grant response previously transmitted by the BS at time slot 721. Because the UL grant response in this example indicates that the NDI is equal to "01", the UE determines that the instruction from the BS is retransmit the first TB using the grant-free UL transmission starting at time slot 716 as the start of a new TTI window (e.g., second TTI window). Accordingly, because the UE is able to determine that the BS requires that the first TB be retransmitted before the first TTI window has closed, the UE may ensure that the BS receives the transmitted TB. This results in improved reliability, while also providing improved latency, and better utilization of the UE and BS resources.

Various example embodiments are directed towards the use of non-scheduled UL grant-free transmissions for 5G URLLC data packets and providing indications for the desired TB scheduling types for the transmissions. By using the different TB scheduling types, the system may allow a UE to transmit two or more different TBs during a single scheduled TTI window.

As will be appreciated, the methods, systems and apparatuses according to the example embodiments have several advantages. The example embodiments may provide for reduction in transmission errors, increased reliability, decreased latency costs, and/or reduction of unnecessary resource consumption related to the UL grant process. Additionally, the example embodiments may provide for more efficient link adaption and resource usage when performing UL grant-free transmissions.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A User Equipment (UE) device for providing transport block indications in uplink (UL) grant-free transmissions, the device comprising:
   a memory having computer readable instructions stored thereon; and
   at least one processor configured to execute the computer readable instructions to,
      transmit a first transport block (TB) to a base station (BS) during a first transmission time interval (TTI) using a grant-free UL transmission,
      receive a UL grant from the BS in a physical downlink control channel (PDCCH) region during a time window,
      determine a target of the UL grant, the target including at least one of the first TB, a second TB, or a previously transmitted TB, based on the UL grant; and
      transmit the target of the UL grant to the BS,
      analyze a transport block size (TBS) of the UL grant and a TBS of the transmitted first TB, and
      in response to the TBS of the UL grant being the same or being a next higher TBS value as the TBS of the transmitted first TB, retransmit the first TB to the BS based on the UL grant.

2. The UE device of claim 1, wherein the at least one processor is further configured to,
   in response to the TBS of the UL grant not being the same and not being a next higher TBS value as the TBS of the transmitted first TB,
      transmit the second TB to the BS based on the UL grant.

3. The UE device of claim 1, wherein the at least one processor is further configured to:
   autonomously select a hybrid automatic repeat request (HARQ) process ID for the grant-free UL transmission; and
   determine a number of bits associated with a new data indicator (NDI) included in the UL grant; and
   in response to the determined number of NDI bits being 2,
      perform at least one of,
         stopping transmission of the first TB using the grant-free UL transmission and determining whether to transmit a new TB based on a value of a different bit field included in the UL grant, the UL grant including the HARQ process ID that is selected by UE,
         retransmitting the first TB to the BS based on the UL grant,
         continuing transmission of the first TB using the grant-free UL transmission and retransmitting a previous TB scheduled for transmission prior to the first TB to the BS based on the UL grant, the UL grant including grant-based UL transmission scheduling information using a HARQ process ID selected by the BS, and
         continuing transmission of the first TB using the grant-free UL transmission and transmitting the second TB to the BS based on the UL grant.

4. The UE device of claim 3, wherein in response to the determined number of NDI bits being 1, the at least one processor is further configured to,
   determine the PDCCH region associated with the UL grant; and
   based on the determined PDCCH region and a value of the NDI bit, perform at least one of,
      stopping transmission of the first TB using the grant-free UL transmission and determining whether to transmit a new TB based on a value of a different bit field included in the UL grant, the UL grant including the HARQ process ID that is selected by the UE,
      retransmitting the first TB to the BS based on the UL grant,
      retransmitting the previous TB to the BS based on the UL grant, and
      transmitting the second TB to the BS based on the UL grant.

5. The UE device of claim 1, wherein in response to results of the determination indicate that the second TB is to be transmitted, the at least one processor is configured to transmit the second TB to the BS based on the UL grant as an ultra-reliable low-latency communication (URLLC) data packet or an enhanced Mobile Broadband (eMBB) data packet.

6. The UE device of claim 1, wherein the at least one processor is further configured to, in response to the UL grant being received in a predefined or a configured timing after the first TTI of transmitting the first TB,
retransmit the first TB to the BS based on the UL grant; or
transmit the second TB to the BS based on the UL grant.

7. A base station (BS) device for providing transfer block indications in uplink (UL) grant-free transmissions, the BS device comprising:
a memory having computer readable instructions stored thereon; and
at least one processor configured to execute the computer readable instructions to,
receive a first transport block (TB) from a User Equipment (UE) during a first transmission time interval (TTI) using a grant-free UL transmission,
determine whether to provide a UL transmission grant to the UE,
transmit a UL grant to the UE in a physical downlink control channel (PDCCH) region during a time window, the UL grant indicating results of the determination of the UL transmission grant status,
receive at least one of the first TB, a second TB, or a previously transmitted TB from the UE based on the UL transmission grant status,
determine a transport block size (TBS) of the UL grant based on a TBS of the received first TB and results of the determination of the UL transmission grant status, and
in response to the determined TBS of the UL grant being the same or being a next higher TBS value as the TBS of the transmitted first TB, receive a retransmission of the first TB from the UE based on the transmitted UL grant.

8. The BS device of claim 7, wherein the at least one processor is further configured to,
in response to the determined TBS of the UL grant not being the same and not being next higher TBS value as the TBS of the received first TB,
receive the second TB from the UE based on the transmitted UL grant.

9. The BS device of claim 7, wherein the at least one processor is further configured to,
select a hybrid automatic repeat query (HARQ) process ID;
set a bit length associated with a new data indicator (NDI);
set a value for the NDI bits, the value of the NDI bits causing the UE to perform at least one of,
stop transmission of the first TB using the grant-free UL transmission,
retransmit the first TB to the BS based on the transmitted UL grant,
continue transmission of the first TB using the grant-free UL transmission and retransmit a previous TB scheduled for transmission prior to the first TB to the BS based on the transmitted UL grant, the transmitted UL grant including grant-based UL transmission scheduling information using the selected HARQ process ID, and
continue transmission of the first TB using the grant-free UL transmission and transmit the second TB to the BS based on the transmitted UL grant; and
transmit the UL grant to the UE, the UL grant including the NDI bits and the selected HARQ process ID.

10. The BS device of claim 9, wherein in response to the set number of NDI bits being 1, the at least one processor is further configured to,
select the PDCCH region associated with the UL grant; and
set a value for the NDI bit, the set value of the NDI bit and the selected PDCCH region causing the UE to perform at least one of,
stop transmission of the first TB using the grant-free UL transmission and determine whether to transmit a new TB based on a value of a different bit field included in the UL grant, the UL grant including the HARQ process ID selected by the UE,
retransmit the first TB to the BS based on the transmitted UL grant,
retransmit the previous TB to the BS based on the transmitted UL grant, and
transmit the second TB to the BS based on the transmitted UL grant.

11. The BS device of claim 7, wherein the second TB is transmitted from the UE as an ultra-reliable low-latency communication URLLC data packet or an enhanced Mobile Broadband (eMBB) data packet.

12. A method for providing transfer block indications in uplink (UL) grant-free transmissions, the method comprising:
transmitting a first transport block (TB) to a base station (BS) during a first time transmission interval (TTI) using a grant-free UL transmission;
receiving a UL grant from the BS in a physical downlink control channel (PDCCH) region during a time window, the UL grant indicating whether the BS grants UL transmission;
determining a target of the UL grant, the target including at least one of the first TB, a second TB, or a previously transmitted TB based on the UL grant; and
transmitting the target of the UL grant to the BS;
analyzing a transport block size (TBS) of the UL grant and a TBS of the transmitted first TB; and
in response to the TBS of the UL grant being the same or being a next higher TBS value as the TBS of the transmitted first TB, retransmitting the first TB to the BS based on the UL grant.

13. The method of claim 12, wherein in response to the TBS of the UL grant not being the same and not being a next higher TBS value as the TBS of the transmitted first TB, the method further comprises:
transmitting the second TB to the BS based on the UL grant.

14. The method claim 12, further comprising:
autonomously selecting a hybrid automatic repeat request (HARQ) process ID for the grant-free UL transmission; and
determining a number of bits associated with a new data indicator (NDI) included in the UL grant, and
in response to the determined number of NDI bits being 2,
performing at least one of,
stopping transmission of the first TB using the grant-free UL transmission and determining whether to transmit a new TB based on a value of a different bit field included in the UL grant, the UL grant including the HARQ process ID that is selected by UE,
retransmitting the first TB to the BS based on the UL grant, continuing transmission of the first TB using the grant-free UL transmission and retransmitting a previous TB scheduled for transmission prior to the first TB to the BS based on the UL grant, the UL grant including grant-based UL transmission scheduling information using a HARQ process ID selected by the BS, and continuing transmission of the first TB using the grant-free UL transmission and transmitting the second TB to the BS based on the UL grant.

15. The method of claim 14, wherein in response to the determined number of NDI bits being 1, the method further comprises:

determining the PDCCH region associated with the UL grant; and based on the determined PDCCH region and a value of the NDI bit, performing at least one of, stopping transmission of the first TB using the grant-free UL transmission and determining whether to transmit a new TB based on a value of a different bit field included in the UL grant, the UL grant including the HARQ process ID that is selected by the UE, retransmitting the first TB to the BS based on the UL grant, retransmitting the previous TB to the BS based on the UL grant, and transmitting the second TB to the BS based on the UL grant.

16. A User Equipment (UE) device for providing transport block indications in uplink (UL) grant-free transmissions, the device comprising:

a memory having computer readable instructions stored thereon; and at least one processor configured to execute the computer readable instructions to, transmit a first transport block (TB) to a base station (BS) during a first transmission time interval (TTI) using a grant-free UL transmission, receive a UL grant from the BS in a physical downlink control channel (PDCCH) region during a time window, determine a target of the UL grant, the target including at least one of the first TB, a second TB, or a previously transmitted TB, based on the UL grant;

transmit the target of the UL grant to the BS;

analyze a transport block size (TBS) of the UL grant and a TBS of the transmitted first TB; and in response to the TBS of the UL grant being not the same and not being a next higher TBS value as the TBS of the transmitted first TB, transmit the second TB to the BS based on the UL grant.

* * * * *